United States Patent [19]
Schroeder et al.

[11] Patent Number: 5,861,451
[45] Date of Patent: Jan. 19, 1999

[54] SPRAYABLE SILICONE EMULSIONS WHICH FORM ELASTOMERS HAVING SMOKE AND FIRE RESISTANT PROPERTIES

[75] Inventors: Robert Mark Schroeder; Arthur James Tselepis; Andreas Thomas Franz Wolf, all of Midland, Mich.

[73] Assignee: Dow Corning Corporation, Midland, Mich.

[21] Appl. No.: 741,498

[22] Filed: Oct. 31, 1996

[51] Int. Cl.$^6$ ........................................................ C08K 4/38
[52] U.S. Cl. ........................... 524/405; 524/413; 524/442; 524/779; 524/783; 524/786; 524/787; 524/437
[58] Field of Search ..................................... 524/779, 783, 524/786, 787, 437, 413, 405, 442

[56] References Cited

U.S. PATENT DOCUMENTS

| | | |
|---|---|---|
| 2,891,920 | 6/1959 | Hyde et al. . |
| 3,294,725 | 12/1966 | Findlay et al. . |
| 3,355,406 | 11/1967 | Cekada, Jr. . |
| 3,360,491 | 12/1967 | Axon . |
| 3,697,469 | 10/1972 | Ikoma . |
| 4,177,177 | 12/1979 | Vanderhoff et al. . |
| 5,674,937 | 10/1997 | Berg et al. ............................ 524/731 |

FOREIGN PATENT DOCUMENTS

| | | |
|---|---|---|
| 0 285 391 A | 10/1988 | European Pat. Off. . |
| 0457616 | 11/1991 | European Pat. Off. . |
| 0 739 928 A | 10/1996 | European Pat. Off. . |
| 0 739 929 A | 10/1996 | European Pat. Off. . |
| 0 739 947 A | 10/1996 | European Pat. Off. . |
| 0 781 798 A | 7/1997 | European Pat. Off. . |
| 4-198 321 | 7/1992 | Japan . |
| WO 9409058 | 1/1993 | WIPO . |
| WO 9409059 | 1/1993 | WIPO . |

*Primary Examiner*—Melvyn I. Marquis
*Attorney, Agent, or Firm*—Patricia M. Scaduto

[57] ABSTRACT

This invention relates to sprayable aqueous silicone emulsions which form silicone elastomers upon the removal of water having improved smoke and fire resistant properties. The aqueous silicone emulsion comprises water, a product of a diorganosiloxane polymer and a crosslinker, a surfactant and a filler selected from the group consisting of aluminum trihydrate, fumed titanium dioxide, magnesium oxide, ceramic fillers and zinc borate. The silicone emulsion has a viscosity of 10,000 to 120,000 mPa s and exhibits pseudo plastic rheology which facilitates its application by spraying. A softening agent may also be added for modulus control.

24 Claims, No Drawings

SPRAYABLE SILICONE EMULSIONS WHICH FORM ELASTOMERS HAVING SMOKE AND FIRE RESISTANT PROPERTIES

FIELD OF THE INVENTION

This invention relates to sprayable aqueous silicone emulsions which form silicone elastomers upon the removal of water having improved smoke and fire resistant properties.

BACKGROUND INFORMATION

The literature teaches that aqueous silicone emulsions are dispersions of siloxane polymers in water. Crosslinking of the siloxane polymers may take place either before or after the evaporation of the water although crosslinking prior to the evaporation of water is more common. Upon the evaporation of water, the silicone emulsions produce silicone elastomers in the form of coatings, seals, caulks, etc.

Generally, silicone elastomers from aqueous silicone emulsions have excellent resistance to weathering, moderate high temperature stability and good low temperature properties. Due to their property profile, silicone elastomers from aqueous silicone emulsions find use as sealants, caulks and additives and are used widely in building construction.

One of the many problems which one encounters with constructing a building is how to seal the many openings that occur through normal construction in a manner which will decrease the spread of flame and the movement of smoke from one part of a building to another in the event of a fire. These openings may occur where two or more structural components of the building meet such as wall-floor joints, wall-wall joints, wall-ceiling joints etc., as well as openings in structural components which are made to accommodate objects such as cables, cable trays, conduits, mechanical piping, ducts and the like which necessarily must pass through the ceilings, walls etc.

In addition to needing a composition having smoke and fire resistant properties, another problem is applying the composition. Current techniques for achieving a smoke barrier typically utilize sealants or closed-cell foams which are pumped, gunned or trowelled into the joints. This is a laborious process and in certain cases the joints may be inaccessible to common sealing or application techniques.

One objective of this invention is to prepare an aqueous silicone emulsion which forms a silicone elastomer upon the removal of water having improved smoke and fire resistant properties.

Another objective is to prepare an aqueous silicone emulsion exhibiting pseudo-plastic rheology, which facilitates its application by spraying and permits a uniform film to be applied to vertical or horizontal surfaces without runs or drips.

SUMMARY OF THE INVENTION

The objectives of this invention can be achieved by preparing a sprayable aqueous silicone emulsion which forms an elastomer upon the removal of water having improved smoke and fire resistant properties. The aqueous silicone emulsion comprises a dispersed phase comprising a product formed from components comprising a diorganosiloxane polymer and a crosslinker selected from the group consisting of linear or cyclic oligomeric aminoxy-functional siloxanes, aminoxy-functional silanes and partial hydrolysis products thereof, water, a surfactant and a filler selected from the group consisting of aluminum trihydrate, fumed titanium dioxide, zinc borate, magnesium oxide and ceramic fillers.

The invention also describes a method for making these silicone emulsions.

DETAILED DESCRIPTION OF THE INVENTION

This invention relates to an aqueous silicone emulsion which forms an elastomer upon the removal of water having improved smoke and fire resistant properties, comprising:

(A) a dispersed phase comprising a product formed from components comprising (i) 100 parts by weight of a diorganosiloxane polymer and (ii) 0.1 to 20 parts by weight of a crosslinker selected from the group consisting of linear aminoxy-functional siloxanes having the general formula $R_3SiO\ (R_2SiO)m(RSi\ (ONR'_2)O)_n SiR_3$, cyclic aminoxy-functional siloxanes having the general formula $(R_2SiO)$, $(RSi(ONR'_2)O)_q$, aminoxy-functional silanes having the general formula $R_cSi(ONR'_2)_{4-c}$ and partial hydrolysis products thereof, where R is the same or a different alkyl group having from 1 to 8 carbon atoms and R' is the same or a different alkyl group having from 1 to 8 carbon atoms, m is an integer from 1 to 20, n is an integer from 3 to 7, p is an integer from 0 to 4, q is an integer from 3 to 7, where p+q is an integer from 3 to 7 and c is 0 or 1;

(B) 50 to 300 parts by weight water;

(C) 0.5 to 10 parts by weight of a surfactant selected from the group consisting of anionic and nonionic surfactants; and (D) 60 to 120 parts by weight of a filler selected from the group consisting of aluminum trihydrate, fumed titanium dioxide, zinc borate, magnesium oxide and ceramic fillers;

the aqueous silicone emulsion having a viscosity of 10,000 mPa s to 120,000 mPa s measured at 24° C. and 2.5 rpm.

Component (A) comprises a dispersed phase comprising a product formed from components comprising (i) a diorganosiloxane polymer and (ii) a crosslinker. The term "diorganosiloxane polymer" as used herein comprises siloxane compositions having mixtures of various types of siloxane polymers as well as compositions having only a single type of siloxane polymer. The diorganosiloxane polymer can also be a homopolymer, copolymer and terpolymer. In addition, the term includes different kinds of molecules, such as long chain linear or branched molecules and short chain linear or branched molecules.

Although not critical to this invention, the viscosity of the diorganosiloxane polymer should be in the range of 5,000 to 500,000 mPa s at 25° C., and preferably in the range of 10,000 to 100,000 mPa s at 25° C., however, higher molecular weight polymers can be used if the viscosity is adjusted using solvent, dilution, polymer blending etc.

Preferred organo groups of the diorganosiloxane polymer are substituted or unsubstituted hydrocarbon radicals having from 1 to 6 carbon atoms such as methyl, ethyl, propyl, vinyl, phenyl and 3,3,3 trifluoropropyl radicals. The most preferred organo group is methyl.

It is preferred that the diorganosiloxane polymers are either endblocked with silanol groups or partially endblocked by trimethylsiloxy groups and partially endblocked by silanol groups. Silanol endblocked diorganosiloxane polymers are most preferred.

The compositions included under the term "diorganosiloxane polymer" and used in the present invention are well known to those skilled in the art and are either commercially available or can be made by known methods.

The crosslinker is selected from the group consisting of linear aminoxy-functional siloxanes having the general formula $R_3SiO\ (R_2SiO)_m(RSi\ (ONR'_2)O)_nSiR_3$, cyclic aminoxy-functional siloxanes having the general formula $(R_2SiO)_p(RSi\ (ONR'_2)O)_q$, aminoxy-functional silanes having the general formula $R_cSi(ONR'_2)_{4-c}$ and partial hydrolysis products thereof.

In the above formulas, R and R' are each the same or a different alkyl group having from 1 to 8 carbon atoms. Examples of R and R' include methyl, ethyl, propyl, hexyl or octyl. R and R' are preferably methyl or ethyl. R is more preferably methyl and R' is more preferably ethyl.

In the above formulas, m is an integer from 1 to 20, n is an integer from 3 to 7, p is an integer from 0 to 4, q is an integer from 3 to 7, where p+q is an integer from 3 to 7 and c is 0 or 1.

Each of the cyclic and linear aminoxy-functional siloxanes and aminoxy-functional silanes described above may hydrolyze to some extent in the aqueous silicone emulsion and these partial hydrolysis products are also included herein.

Examples of aminoxy-functional silanes include $MeSi(ONEt_2)_3$ and $EtSi(ONEt_2)_3$, etc., where Me is methyl and Et is ethyl.

Examples of cyclic aminoxy-functional siloxanes include $(MeEtSiO)_2(MeSi(ONEt_2)O)_3$, $(Me_2SiO)_2(MeSi(ONEt_2)O)_3$, $(MeEtSiO)_2(MeSi(ONEt_2)O)_4$, $(MeSi(ONEt_2)O)_5$, and $(Me_2SiO)(MeSi(ONEt_2)O)_4$, etc., where Me is methyl and Et is ethyl.

Examples of linear aminoxy-functional siloxanes include $Me_3SiO\ (Me_2SiO)_3(MeSi\ (ONEt_2)O)_5SiMe_3$, $Me_3SiO\ (Me_2SiO)_4(MeSi\ (ONEt_2)O)_5SiMe_3$, $Me_3SiO(Me_2SiO)_5(MeSi(ONEt_2)O)_3SiMe3$, $Me_3SiO(Me_2SiO)_3(MeSi(ONEt_2)O)_7SiMe_3$ etc., where Me is methyl and Et is ethyl.

Preferred crosslinkers are the cyclic and linear aminoxy-functional siloxanes with $(MeEtSiO)_2\ (MeSi(ONEt_2)O)_3$ and $Me_3SiO(Me_2SiO)_3(MeSi(ONEt_2)O)_5SiMe_3$ being more preferred and $Me_3SiO(Me_2SiO)_3(MeSi(ONEt_2)O)_5SiMe_3$ being most preferred, in each case where Me is methyl and Et is ethyl.

Generally, the crosslinker is added in amount from 0.1 to 20 parts by weight based on 100 parts by weight diorganosiloxane polymer. Preferably, 2 to 5 parts by weight based on 100 parts by weight diorganosiloxane polymer is used. The crosslinker may be added as a single species or as a mixture of two or more different species.

An optional ingredient is a softening agent selected from non-reactive, low molecular weight polydimethylsiloxane (PDMS), compatible organic plasticizers and chain extenders having the formula $R''_2SiX_2$. As used herein, softening agent means an ingredient which when added to the emulsion helps lower the modulus of the silicone elastomer formed upon the removal of water.

The non-reactive, low molecular weight PDMS includes PDMS having a viscosity of 1000 MPa s or less. As used herein, the term "nonreactive" includes trimethylsilyl-terminated PDMS.

Compatible organic plasticizers include ester alcohols such as Texano® supplied by Eastman Chemical, trioctyl phosphate supplied by Bayer, low molecular weight polybutenes such as Panalane™ or Indopol™ supplied by Amoco Chemical Company, and dialkyl alkylphosphonates such as dimethylmethylphosphonate, diethylethylphosphonate and dibutylbutylphosphonate, supplied from Mobil Chemical Company.

For the chain extender $R''_2SiX_2$, R" is individually selected from monovalent hydrocarbon radicals having from 1 to 8 carbon atoms such as methyl, ethyl, propyl, vinyl and phenyl. Preferably, R" is individually selected from monovalent hydrocarbon radicals having from 1 to 6 carbon atoms. Most preferably, R" is a methyl radical.

X is a hydrolyzable group. Hydrolyzable groups include any group attached to silicon which is hydrolyzed by water at room temperature. Suitable hydrolyzable groups include but are not limited to hydrogen; halogen atoms such as chlorine, bromine, fluorine or iodine; groups of the formula —OT when T is any hydrocarbon or halogenated hydrocarbon group such as methyl, ethyl, iso-propyl, octadecyl, allyl, hexenyl, cyclohexyl, phenyl, benzyl, beta-phenylether, 2-chloroethyl, chlorophenyl, 3,3,3-trifluoropropyl, or bromocyclohexyl; any hydrocarbon ether radical such as 2-methoxyethyl, 2-ethoxyisopropyl, 2-butoxyisobutyl, p-methoxyphenyl or —$(CH_2CH_2O)_2CH_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; any acyloxy group such as acetoxy, benzoyloxy, propionoxy, or acryloxy; or any amino radical such as $NH_2$, dimethylamino, diethylamino, ethylmethylamino, diphenylamino, methylphenylamino or dicyclohexylamino. X can also be any aminoxy radical of the formula —$ONT_2$ or —ONT' in which T is as defined above and T' is any divalent hydrocarbon radical both valences of which are attached to the nitrogen, such as hexylene, pentylene or octylene; any ketoxime radical of the formula —ON=$CT_2$ or —ON=CT' in which T and T' are defined above; ureido groups of the formula —N(T)CONT"$_2$ in which T is defined above and T" is H or any of the T radicals; carbamate groups of the formula —OOCNTT" in which T and T" are defined above; or carboxylic amide radicals of the formula —NTC=O(T") in which T and T" are defined above. X can also be the sulfate group or the sulfate ester groups of the formula —$OSO_2$(OT) where T is as defined above; the cyano group; the isocyanate group; and the phosphate or phosphate ester groups of the formula —$OPO(OT)_2$ where T is as defined above.

Chain extenders are the preferred softening agent because they have a permanent effect on the modulus of the silicone elastomer formed upon the removal of water. Preferred chain extenders are $R''_2Si(OMe)_2$, $R''_2Si(OOCMe)_2$, $R''_2Si(ONEt_2)_2$, $(R''Si(ONEt_2)O)_2(R''_2SiO)_z$ and $R''_2Si(NR''C(O)R'')_2$. More preferred chain extenders are $Me_2Si(OMe)_2$, $Me_2Si(OOCMe)_2$, $(R''Si(ONEt_2)O)_2(MeEtSiO)_2$ and $MeViSi(NMeC(O)Me)_2$. The most preferred chain extenders are $Me_2Si(OMe)_2$, $Me_2Si(OOCMe)_2$ and $MeViSi(NMeC(O)Me)_2$. As used above, R" is individually selected from an alkyl or alkenyl radical, Me is methyl, Et is ethyl, Vi is vinyl and z is 2 or 3.

The softening agent may be added in an amount up to 30 parts by weight based on 100 parts by weight diorganosiloxane polymer. Preferably, 0.5 to 20 parts by weight based on 100 parts by weight diorganosiloxane polymer is used. More preferably, 0.5 to 2 parts by weight based on 100 parts by weight diorganosiloxane polymer is used. The softening agent may be added as a single species or as a mixture of two or more different species.

The diorganosiloxane and crosslinker react forming the product. In a preferred embodiment, the product further comprises a softening agent. In a more preferred embodiment, a diorganosiloxane polymer, a crosslinker and a chain extender react to form the product. The latter methods are preferred because they provide a reduction in the modulus of the silicone elastomer formed when the emulsion is dried. This reduction in modulus provides the cured silicone elastomer with enhanced movement capability which can be useful, for example, when the silicone elastomer is sealing openings in buildings such as described in Joffre, et al., U.S. Pat. No. 5,744,199.

A crosslinking catalyst is not necessary with the crosslinkers useful in this invention, however, depending on the experimental conditions it may be desirable to use one. For instance it may be desirable to use a condensation catalyst to increase the reactivity of the chain extender. Examples of suitable crosslinking catalysts include triethylamine, acetic acid and tin compounds such as stannous octoate, dibutyltindilaurate and dioctyltindilaurate.

Component (B) is water. The silicone emulsion is in the form of an oil-in-water emulsion such that the crosslinked product of the diorganosiloxane polymer and crosslinker comprise a dispersed phase and water comprises a continuous phase. The water is usually present in the amount of 50 to 300 parts by weight based on 100 parts by weight of the diorganosiloxane polymer. Preferably, the water is present in the amount of 70 to 200 parts by weight based on 100 parts by weight of the diorganosiloxane polymer.

Component (C) is a surfactant selected from the group consisting of anionic and nonionic surfactants. The term "surfactant" is meant to describe a surface active agent. Any conventional anionic or nonionic surfactant or mixtures thereof can be used in the aqueous dispersion of this invention. Such surfactants are well known in the art and can be found more fully enumerated in "Synthetic Detergents" by J. W. McCutcheon, published by MacNair-Dorland Company, New York.

Illustrative examples of anionic surfactants include alkali metal and ammonium salts of long chain alkyl sulfates and sulfonates and the alkylene oxide condensates of long chain alcohols, fatty acids, and the like. Specific examples are dodecylbenzenesulfonate, sodium lauryl sulfate and sodium dioctyl sulfosuccinate.

Illustrative examples of nonionic surfactants include polyoxyalkylene alkyl ethers, polyoxyalkylene sorbitan esters, polyoxyalkylene esters, polyoxyalkylene alkylphenyl ethers, ethoxylated amides, ethoxylated siloxanes, block copolymers of propylene oxide and ethylene oxide and others. Specific examples are ethoxylated trimethylnonanol and a silicone glycol hydrosilyation product of heptamethyltrisiloxane and ethoxylated allyl alcohol.

Nonionic surfactants are preferred, with ethoxylated trimethylnonanol and a silicone glycol hydrosilyation product of heptamethyltrisiloxane and ethoxylated allyl alcohol being more preferred.

Generally, the amount of surfactant used should be that amount which stabilizes the dispersed phase of the silicone emulsion. An amount from 0.5 to 10 parts by weight based on 100 parts by weight diorganosiloxane polymer should be sufficient. Preferably, the surfactant is present in an amount from 2 to 6 parts by weight based on 100 parts by weight diorganosiloxane polymer. The surfactant may be added as a single species or as a mixture of two or more different species.

Component (D) is a filler selected from the group consisting of aluminum trihydrate, fumed titanium dioxide, zinc borate, magnesium oxide and ceramic fillers such as silicon carbide. Aluminum trihydrate (ATH) and fumed titanium dioxide are the preferred fillers. The filler may be added as a single species or as a mixture of two or more different species. It is more preferred to add a mixture of the ATH and fumed titanium dioxide in order to get optimal smoke and fire resistant properties at a reasonable cost.

Generally, the filler may be added in amounts of 60 to 120 parts by weight based on 100 parts by weight diorganosiloxane polymer. Preferably, the filler is added in amounts from 70 to 90 parts by weight based on 100 parts by weight diorganosiloxane polymer. More preferably a mixture of ATH and fumed titanium dioxide is used such that up to 10 weight percent of the filler is fumed titanium dioxide, with 5 to 7 weight percent fumed titanium dioxide being most preferable.

Although not wanting to be held to one theory, the inventors believe that these fillers, in the amounts specified, provide the improvement in smoke and fire resistance properties of the silicone elastomer formed upon the removal of water.

The viscosity of the silicone emulsion may range from 10,000 mPa s to 120,000 mPa s measured at 24° C. and 2.5 rpm in accordance with ASTM Method D 2196 - 86 "Standard Test Method for Rheological Properties of Non-Newtonian Materials by Rotational (Brookfield) Viscometer". Preferably, the viscosity ranges from 20,000 mPa s to 80,000 mPa s measured at 24° C. and 2.5 rpm. This range of viscosity enables the silicone emulsion to be applied to a substrate by brush, roller, spraying or the like. The most preferred viscosity for the silicone emulsion is 30,000 to 50,000 mPa s measured at 24° C. and 2.5 rpm.

It is preferred that the silicone emulsion exhibit pseudo plastic rheology or shear thinning, which in essence means the silicone emulsion has a low viscosity at high shear, such as occurs upon atomization with spray applications, and a much higher viscosity at low shear. This pseudo plastic rheology facilitates the application of the coating by spraying. The coating may be applied in a thin layer which quickly thickens so that the coating does not soak into any support material or the coating may be applied in a thick layer which will not sag.

It is also preferred that the total solid content of the silicone emulsion range from 40 to 70% with 60 to 70% being more preferred. "Total solid content" as used herein means solids remaining after exposure of the emulsion to 150° C. for 1 hour.

Optional ingredients, including adhesion promoters, pigments, stabilizers, defoamers, in situ reinforcement resins etc. may also be added to the silicone emulsion.

The aqueous silicone emulsions may be made by methods known in the art. For example, they may be prepared by the process of emulsion polymerization, a process well known to those skilled in the art and taught in U.S. Pat Nos. 2,891,920, 3,294,725, 3,355,406, 3,360,491 and 3,697,469 all of which are incorporated herein by reference. Another method for preparing the aqueous silicone emulsions is by emulsifying preformed diorganosiloxane polymers. This direct emulsification method is also well known to those skilled in the art and taught for example in U.S. Pat. No. 4,177,177, and pending patent applications, Berg, et al. Ser. No. 08/430047 filed Apr. 27, 1995 "Elastomers from Silicone Emulsions having Self Catalytic Crosslinkers," Berg et al., U.S. Pat. No. 5,674,937 Ser. No. 08/430776 filed Apr. 27, 1995, "Shelf-Stable Crosslinked Emulsion with Optimum Consistency and Handling without the Use of Thickeners", Joffre, et al. Ser. No. 08/430772, filed Apr. 27, 1995, "Improved Physical Properties from Silicone Latices through Appropriate Surfactant Selection" each of which is hereby incorporated by reference.

With emulsion polymerization, cyclic or linear siloxane oligomers are dispersed in water with an anionic or nonionic surfactant or a mixture thereof to form a premixture. The premixture is then mixed at high shear until an emulsion comprising an aqueous phase and a dispersed phase comprising droplets of siloxane oligomers, having particle sizes of between 100–5000 nm, is formed. An acid or base may be added to the premixture either prior to emulsification or after emulsification is complete which catalyzes the emulsion polymerization. Alternatively, the surfactant may be converted to its acidic or basic form using an ion exchange procedure as described in U.S. Pat. No. 3,697,469 which is incorporated by reference. Although the polymerization will proceed satisfactorily at room temperature, it can be run at elevated temperatures as well, a preferred range being 25° C. to 80° C. The time of polymerization will generally take from 1 to 24 hours depending on the temperature and the desired molecular weight of the polymer. After the diorganosiloxane polymer has reached the desired molecular weight, polymerization is terminated by neutralizing the emulsion.

The crosslinker and if desired a crosslinking catalyst or a softening agent can be added prior to emulsification or during polymerization. Oftentimes and preferably, however, the crosslinker and crosslinking catalyst if desired will be added to the emulsion after polymerization is complete. The crosslinker, in this situation, must be capable of migrating from the water into the dispersed phase and still maintain its reactivity.

The filler can be added prior to emulsification or during polymerization. Preferably, however, the filler is added to the emulsion after crosslinking is complete. More preferably because of ease of processing, the filler is premixed with water and surfactant and then the crosslinked emulsion is added to this dispersion.

Other optional ingredients, such as adhesion promoters, pigments, stabilizers, in-situ reinforcement resins, defoamers etc. may also be added at any time.

With direct emulsification, a mixture containing diorganosiloxane polymers, surfactant and water is formed at a temperature from 10° C. to 70° C. and then emulsified by mixing with sufficient shear for a sufficient period of time. For this invention, an anionic or non-ionic surfactant is used singly or as a mixture. The diorganosiloxane polymers useful in this process have a viscosity of greater than 5000 mPa s but less than 500,000 mPa s, however, higher molecular weight polymers can be used if the viscosity is adjusted using solvent, dilution, polymer blending etc.

The crosslinker and if desired a crosslinking catalyst or softening agent can be added before or after emulsification. Oftentimes and preferably, however, the crosslinker and crosslinking catalyst if desired will be added after emulsification. The crosslinker, in this situation, must be capable of migrating from the water into the dispersed phase and still maintain its reactivity. The softening agent is preferably added prior to emulsification.

The filler can be added prior to emulsification or before crosslinking. Preferably, however, the filler is added to the emulsion after crosslinking is complete. More preferably because of ease of processing, the filler is premixed with water and surfactant and then the crosslinked emulsion is added to this dispersion.

Additional amounts of water may also be added at any stage of the process if a lower polymer solids content is desired. Other ingredients, such as adhesion promoters, pigments, stabilizers, in-situ reinforcement resins, defoamers etc. may also be added at any stage of the process.

The sprayable silicone emulsions of this invention cure into elastomers having improved smoke and fire resistant properties.

EXAMPLES

The following examples are presented for illustrative purposes and should not be construed as limiting the invention which is delineated in the claims.

Durometer results were obtained by the method described in ASTM C661 "Indentation Hardness of Elastomeric-Type Sealants by Means of a Durometer". Tensile and elongation results were obtained by the method described in ASTM D412 "Vulcanized Rubber and Thermoplastic Rubbers and Thermoplastic Elastomers—Tension" using dumbbell specimens with an L dimension equal to 1.27 mm.

Example 1

Into a 10 liter Turello pot was charged 5000 g of a 15% trimethylsiloxy, 85% silanol endcapped polydimethylsiloxane having a viscosity of 12,000 mPa s, 100 g ($Me_3SiO(Me_2SiO)_3(Me(ON(ethyl)_2)SiO)_5SiMe_3$) where Me is methyl (AOPS), 100 g methyltrimethoxysilane (MTM) and 50 g $(MeO)_2MeSiO(Me_2SiO)_nSi(OMe)_2CH_2CH_2CH_2NHCH_2CH_2NH_2$, where n=6–12 and Me is methyl (AAPS) premixed with 3.8 g glacial acetic acid. The pot was stirred for 2 min at 200 RPM to yield a uniform mixture. To this mixture was added 150 g of Tergitol® TMN-10 (ethoxylated trimethylnonanol, HLB=16.1) surfactant and 150 g of water. This mixture was stirred for three min at 1600 RPM. A clear, non-flowing gel was formed. This gel was further diluted by adding 1000 g of water to the agitated pot over a 3 min period. This material was deaired under vacuum to yield approximately 6.5 liter of a milky white 80% solids crosslinked silicone emulsion.

Example 2

Into a 10 liter Turello pot was charged 5000 g of a 15% trimethylsiloxy, 85% silanol endcapped polydimethylsiloxane having a viscosity of 12,000 mPa s, 100 g AOPS, 100 g MTM, 50 g AAPS and 3.8 g glacial acetic acid. The pot was stirred for 2 min at 200 RPM to yield a uniform mixture. To this mixture was added 150 g of a silicone glycol hydrosilation product of heptamethyltrisiloxane and ethoxylated allyl alcohol and 150 g of water. This mixture was stirred 3 min at 1600 RPM to create a clear non-flowing gel. This gel was reduced to a 80.8% solids crosslinked silicone emulsion through the addition of 1000 g of water over a period of 3 min while maintaining agitation.

Example 3

Into a 300 liter Turello pot was added 199 kg of 50,000 mPa s, silanol endblocked polydimethylsiloxane and 4.5 kg of AOPS. This mixture was mixed for 1 min and a mixture of 6.3 kg of Tergitol®TMN-10 surfactant diluted with 5 kg of water was added over a 2 min period under agitation. This resulted in a clear non-flowing gel. This gel was reduced to 79.4 percent solids through the addition of 41 kg of water to yield approximately 246 liter of milky white crosslinked silicone emulsion.

Example 4

To a 300 liter Turello pot was added 160 kg 50,000 mPa s, silanol endblocked polydimethylsiloxane, 3.1 kg AOPS, 2.4 kg MTM, and 1.1 kg of AAPS premixed with 0.09 kg glacial acetic acid. This mixture was stirred for 1 min and 4.5 kg Tergitol TMN-10 diluted with 3.6 kg water was slowly added while maintaining agitation. This resulted in a clear non-flowing gel which was further diluted with 21.8 kg water to yield a milky white emulsion. To this crosslinked PDMS emulsion was added 3.2 kg 100 mPa s Me₃Si(OSiMe₂)ₙOSiMe₃ n=approximately 40 to yield approximately 204 liter of 84% solids crosslinked silicone emulsion.

Example 5

To a 10 liter Turello pot was charged 5000 g 50,000 mPa s, silanol endblocked polydimethylsiloxane, 100 g AOPS, a premix consisting of 70 g MTM, 43 g (Me)₂Si(OMe)₂ (DMDM) and 43 g Texanol® ester alcohol; and 34.1 g AAPS and 1.9 g glacial acetic acid. The pot was stirred for 2 min at 200 rpm to yield a uniform mixture. To this mixture was added 166.7 g of Tergitol®TMN-l0 and 133.3 g of water. This mixture was stirred for 3 min at 1600 rpm and a clear, non-flowing gel was formed. This gel was further diluted by adding 600 g of water to the agitated pot over 3 min. This material was deaired under vacuum to yield approximately 6.5 liter of a milky white 83.8% solids crosslinked silicone emulsion.

Example 6

To a 10 liter Turello pot was added 1715.2 g of crosslinked silicone emulsion prepared as in Example 2. To this was added 850 g of water and 49.8 g of Johncryl 61V (water soluble polymeric acrylic resin). This mixture was stirred approximately 2 min until uniform and while agitation was maintained 1767.1 g of Hydral 710 (1 micron particle size aluminum trihydrate) (ATH) was dusted in. This mixture was allowed to stir 20 min at 2000 rpm to disperse the ATH. The composition was diluted to 70% total solids by the addition of 153.2 g of water and deaired under vacuum to yield about 4 liter of an ATH filled coating.

This coating was cast on glass and dried overnight to form a tack free elastomer. This elastomer was baked for one week at 200° C. and found to have cohesive adhesion to glass and a weight loss of only 3.91%.

Example 7

To a 10 liter Turello pot was charged 2122.6 g of water and 152.5 g of Johncryl 61LV (water soluble polymeric acrylic resin). This mixture was stirred until uniform and 2635.4 g of Hydral 710 (ATH) was added. This mixture was stirred at 800 RPM for 10 min to disperse the ATH and 26.58 g of W7114 Black (dispersion of black iron oxide (55%) in water and surfactant) was added. Stirring was continued for 2 min and 3208.51 g of the silicone emulsion described in Example 1 was added. This mixture was stirred at 800 rpm for 3 min and 5 g of Nalco 2311 (mineral oil base defoamer) was added. The sample was deaired under vacuum and filtered through a 200 micron filter bag to yield approximately 8 liter of 659 solids coating.

This coating was applied using a 0.635 cm nap roller to three 0.635 cm×61 cm×244 cm Sterling boards. The coating was applied 0.25 mm thick in two coats. The coating was allowed to dry for one week and the boards were sent to Underwriters Laboratory for testing according to ASTM test method E84-95 "Standard Test Method for Surface Burning Characteristics of Building Materials." The results of the E-84 testing were less than 50 for smoke generation and less than 25 for flame spread (Dry red oak=100).

Example 8

To a 10 liter Turello pot was charged 1948.6 g of water and 158.6 g of Johncryl 61LV. This mixture was stirred until uniform and 2696.96 grams of Hydral 710 (ATH) was added. This mixture was stirred at 800 RPM for 10 min to disperse the ATH and 66.4 g of W3041 Red (dispersion of red iron oxide (68%) in water and surfactant) was added. Stirring was continued for 2 min and 3325.2 g of the silicone emulsion described in Example 2 was added. This mixture was stirred at 800 RPM for 3 min and 5.39 g of Nalco 2311 (mineral oil base defoamer) was added. The sample was deaired under vacuum and filtered through a 200 micron filter bag to yield approximately 8 liter of 67% solids coating.

This coating was applied using a 0.635 cm nap roller to three 0.635 cm×61 cm×244 cm Sterling boards. The coating was applied 0.25 mm thick in two coats. The coating was allowed to dry for one week and the boards were sent to Underwriters Laboratory for testing according to ASTM test method E84-95 "Standard Test Method for Surface Burning Characteristics of Building Materials." The results of the E-84 testing were less than 50 for smoke generation and less than 25 for flame spread (Dry red oak=100).

Example 9

Three coatings were prepared having the formulations described in Table 1. The samples were prepared by charging the described amounts of water, Tergitol TMN-6 (ethoxylated trimethylnonanol surfactant HLB=11.7) and Tergitol TMN-10 to a 10 liter Turello pot. Agitation (600 RPM) was begun and the desired pigments were dusted in (Hydral 710 and/or Degussa P-25 TiO₂). The colorants were then added as well as the described emulsion and the mixture was stirred until uniform. If required, Nalco 1115 was then added as well as Nalco 2311 defoamer. The samples were deaired under vacuum to remove foam and filtered using a 200 micron filter bag.

TABLE 1

| Ingredients (g) | Coating 1 | Coating 2 | Coating 3 |
| --- | --- | --- | --- |
| Water | 2040 | 2034 | 805 |
| Tergitol TMN-6[1] | 9.3 | 8.5 | 8.5 |
| Tergitol TNM-10[2] | 9.3 | 8.5 | 8.5 |
| Hydral 710[3] | 2489.1 | 2327 | 2328 |
| Degussa p-25[4] | none | 166 | none |
| W7114 Black[5] | 4.1 | 17 | none |
| W1025 Yellow[6] | 16.5 | none | none |
| W3041 Red[7] | none | none | 8.5 |
| Nalco 1115[8] | none | none | 1109 |
| Example 4 Emulsion | 3692.3 | 3934 | none |
| Example 3 Emulsion | none | none | 4177.9 |
| Nalco 2311[9] | 8.3 | 8.5 | 8.5 |

[1]Tergitol TMN-6 - Ethoxylated Trimethylnonanol surfactant, HLB = 11.7
[2]Tergitol TMN-10 - Ethyoxylated Trimethylnonanol surfactant HLB = 16.1
[3]Hydral 710 - 1 micron particle size aluminum trihydrate
[4]Degussa P-25 - Fumed titanium dioxide
[5]W7114 Black - dispersion of Black Iron oxide (55%) in water and surfactant
[6]W1025 Yellow - Dispersion of Yellow Iron oxide (62%) in water and surfactant
[7]W3041 Red - Dispersion of Red Iron oxide (68%) in water and surfactant
[8]Nalco 1115 - 4 nm colloidal silica
[9]Nalco 2311 - mineral oil based defoamer The 3 coatings above were cast as 0.75 mm slabs and tested for durometer, tensile and elongation after two weeks dry time at room temperature. See Table 2.

TABLE 2

|  | Durometer Shore A | Tensile psi (MPa) | Elongation % at Break | 200% Modulus psi (MPa) |
|---|---|---|---|---|
| Coating 1 | 25 | 119 (0.82) | 1485 | 58 (0.4) |
| Coating 2 | 24 | 113 (0.78) | 1310 | 52 (0.36) |
| Coating 3 | 32 | 168 (1.2) | 690 | 88 (0.61) |

Example 10

To a 10 liter Turello pot was charged 2189 g of water, 9.4 g of Tergitol TMN-6 and 9.4 g of Tergitol TMN-10. The scraper blade on the Turello was turned on and 2520 g of Hydral 710 (ATH) was added. After ATH addition, the disperser blades were turned on and the mixture was stirred at 800 RPM for 10 min. 4.16 g of W7114 black and 16.7 g of W1025 yellow (dispersion of yellow iron oxide (62%) in water and surfactant) were added and stirring was continued for an additional 2 min. Mixer was stopped and 3738 g of the crosslinked silicone emulsion described in Example 4 was added. This mixture was stirred with scraper blade and disperser blades at 800 rpm for 5 min and 4.41 g of Nalco 2311 defoamer was added. The formulated coating was deaired under vacuum and filtered through 200 micron filter to yield approximately 8 liter of coating.

The rheology of the above material was tested using a Brookfield HATDV-II viscometer in accordance with ASTM Method D2196-86 "Standard Test Method for Rheological Properties of Non-Newtonian Materials by Rotational (Brookfield) Viscometer" using a #4 Spindle at 24° C. (75° F.). The results are described in Table 3.

TABLE 3

Measurement of Viscosity of Coating at Various Speeds

| Speed (rpm) | Viscosity (mPa s) |
|---|---|
| 0.5 | $97.6 \times 10^3$ |
| 1.0 | $62.8 \times 10^3$ |
| 2.5 | $34.7 \times 10^3$ |
| 5.0 | $23.0 \times 10^3$ |
| 10.0 | $15.1 \times 10^3$ |
| 20.0 | $9.9 \times 10^3$ |
| 50.0 | $6.76 \times 10^3$ |

The liquid coating was cast on polyethylene 1.25 mm thick. This material dried to form a tack free elastomer 0.75 mm thick. After 30 days dry time the elastomer was tested for Shore A Hardness, tensile, 200% Modulus and elongation at break using an Instron Tester. The results are as follows:

| Tensile | 119 psi (0.82 MPa) |
|---|---|
| Shore A Durometer | 25 |
| % Elongation at Break | 1485 |
| 200% Modulus | 58 psi (0.4 MPa) |

This material was also tested for freeze thaw stability in accordance with ASTM method D 2243-82 and no coagulation was noted after 10 freeze/thaw cycles.

Example 11

To a 10 liter Turello pot was charged 2069 g of water, 8 g of Tergitol TMN-6 and 8 g of Tergitol TMN-10. The scraper blade on the Turello was turned on and 160 g of fumed titanium dioxide (P-25 from Degussa) and 2224 g of Hydral 710 (ATH) were added. After this addition, the disperser blades were turned on and the mixture was stirred at 800 rpm for 10 min. 8 g of W7114 black was added and stirring was continued for an additional 2 min. Mixer was stopped and 3538 g of the crosslinked silicone emulsion described in Example 4 was added. This mixture was stirred with scraper blade and disperser blades at 800 rpm for 5 min and 8 g of Nalco 2311 defoamer was added. Formulated coating was deaired under vacuum and filtered through 200 micron filter to yield approximately 8 liter of coating.

The rheology of the above material was tested using a Brookfield HATDV-II viscometer in accordance with ASTM Method D 2196 - 86 "Standard Test Method for Rheological Properties of Non-Newtonian Materials by Rotational (Brookfield) Viscometer" using a #4 Spindle at 75° F. (24° C.) The results are provided in Table 4.

TABLE 4

| Speed (rpm) | Viscosity (mPa s) |
|---|---|
| 0.5 | $240 \times 10^3$ |
| 1.0 | $158 \times 10^3$ |
| 2.5 | $78.4 \times 10^3$ |
| 5.0 | $46.8 \times 10^3$ |
| 10.0 | $28.4 \times 10^3$ |
| 20.0 | $17.5 \times 10^3$ |

The liquid coating was cast on polyethylene 1.25 mm thick. This material dried to form a tack free elastomer 0.75 mm thick. After 30 days dry time the elastomer was tested for Shore A Hardness, tensile, 200% Modulus and elongation at break using an Instron Tester. The results are as follows:

| Tensile | 113 psi (0.78 MPa) |
|---|---|
| Shore A Durometer | 24 |
| % Elongation at Break | 1310 |
| 200% Modulus | 52 psi (0.36 MPa) |

This material was also tested for freeze thaw stability in accordance with ASTM method D 2243-82 "Standard Test Method for Freeze Thaw Resistance of Latex and Emulsion Paints" and no coagulation was noted after 10 freeze/thaw cycles.

Example 12

To a 300 liter Turello pot was charged 63.4 kg water, 0.24 kg Tergitol TMN-6 and 0.24 kg Tergitol TMN-10. The scraper blade of the Turello was started and with the scraper only the following materials were poured in over a 10 min period: 4.9 kg Degussa P 25 $TiO_2$, 0.23 kg W7114 black pigment and 68.1 kg Hydral 710 (ATH). The agitators were turned on and the material was stirred for 10 min at 800 rpm. The mixer was shut down and the pot was removed and 108.3 kg of the emulsion described in Example 4 was added. The mixer was restarted and the mixture was blended until uniform (approximately 10 min). 0.23 kg Nalco 2311 defoamer was added and the material was deaired under vacuum and drummed off.

Solids of the coating were determined by baking a one gram sample in an aluminum dish for 90 min at 150° C. The solids were 68.5%. This is in relatively good agreement with the theoretical value of 67.0%.

Samples of this material were tested for adhesion-in-peel according to ASTM C794-93 using 30 days dry time at 22°+/−2° C., 50+/−5% relative humidity. These samples were also tested after heating at 100° C. for 24 hr. The results are given in Table 5.

TABLE 5

| Substrate | Peel Strength 30 days 22 +/− 2° C. lbf/in (N/cm) | Peel Strength 30 days + 24 hr 100° C. lbf/in (N/cm) |
|---|---|---|
| Concrete | 2(3.5) | 3(5.25) |
| Grout | 4(7) | 5(8.75) |
| Fiber Board | 5(8.75) | 15(26.25) |
| Galvanized Steel | 4.5(7.875) | 7.5(13.125) |
| Glass | 3.5(6.125) | 4.5(7.875) |
| Pine | 3(5.25) | 6(10.5) |

Example 13

8 emulsions were prepared having the formulations described in Table 6 below. The general procedure for each sample was as follows: Charge to Hauschild cup desired amount of 50,000 mPa s, silanol endblocked polydimethylsiloxane polymer. Then add AOPS, AAPS and glacial acetic acid in desired amounts and spin 12 sec. Next, add MTM, DMDM and Texanol ester alcohol and stir additional 12 sec. Add Tergitol TMN-10 and first water and spin 12 sec to generate a clear gel phase. Then add dilution water spinning another 12 sec to form emulsions each having a total solid content of 80%.

TABLE 6

| Ingredients (g) | Emulsions | | | | | | | |
|---|---|---|---|---|---|---|---|---|
| | 13-1 | 13-2 | 13-3 | 13-4 | 13-5 | 13-6 | 13-7 | 13-8 |
| —OH endblocked PDMS | 69.89 | 69.89 | 69.89 | 69.89 | 69.89 | 69.89 | 69.89 | 69.89 |
| AAPS | 1.36 | 1.36 | 1.36 | 1.36 | 1.36 | 1.36 | 1.36 | 1.36 |
| AOPS | 0.45 | 0.45 | 0.45 | 0.45 | 0.45 | 0.45 | 0.45 | 0.45 |
| Acetic Acid | 0.03 | 0.03 | 0.03 | 0.03 | 0.03 | 0.03 | 0.03 | 0.03 |
| MTM | 1 | 0.98 | 1.3 | 1 | 0.9 | 1 | 1.1 | 1 |
| DMDM | 0.2 | 0.43 | 0.2 | 0.2 | 0.6 | 0.5 | 0.2 | 0.5 |
| Texanol | 0.85 | 0.27 | 0.1 | 0.85 | 0.6 | 0.6 | 0.8 | 0.1 |
| Tergitol TMN-10 | 2.14 | 2.14 | 2.14 | 2.14 | 2.14 | 2.14 | 2.14 | 2.14 |
| Water | 3.09 | 3.09 | 3.09 | 3.09 | 3.09 | 3.09 | 3.09 | 3.09 |
| dilution water | 6 | 6 | 6 | 6 | 6 | 6 | 6 | 6 |

Example 14

The eight emulsions from Example 13 were formulated into coatings using the following procedure: Charge the following materials to a Hauschild cup: 20.6 g water, 0.15 g Tergitol TMN-6, 0.15 g Tergitol TMN-10, 1.59 g Degussa P-25, 22.11 g Hydral 710 and 0.07 g W7114 Black and spin 12 sec to create a uniform dispersion of pigment in surfactant and water. To each of these dispersions was added 35.28 g of one of the emulsions from example 13, ie coating 13-1C used emulsion 13-1. This resulted in 8 formulated coatings each having a total solid content of 68.5% that were cast as 25 mm slabs on polyethylene. Films were allowed to dry for 14 days at 25°+/−5° C. and 50+/−2% relative humidity and then physical properties were tested. The results are provided in Table 7.

TABLE 7

| Coatings | Shore A Durometer | Tensile (MPa) | Elongation % | Modulus 200% (MPa) |
|---|---|---|---|---|
| 13-1C | 10 | 0.47 | 1295 | 0.22 |
| 13-2C | 9 | 0.37 | 1390 | 0.18 |
| 13-3C | 11 | 0.38 | 864 | 0.21 |
| 13-4C | 8 | 0.49 | 1220 | 0.23 |
| 13-5C | 9 | 0.49 | 1348 | 0.21 |
| 13-6C | 7 | 0.50 | 1370 | 0.22 |
| 13-7C | 7 | 0.54 | 1334 | 0.24 |
| 13-8C | 10 | 0.51 | 1337 | 0.22 |

Example 15

To a two gallon stainless steel pot was charged 2100 g of $HOSi(Me)_2[OSi(Me)_2]_nOSi(Me)_2OH$ where n=40 and Me is methyl, 90 g sodium laurel sulfate, 775 g deionized water and 21 g dodecylbenzene sulfonic acid. This material was stirred for 30 min and then passed 3 times through a Microfluidizer® at 5000 psi. The resulting oil in water emulsion had an average particle size of 316.5 nm. This emulsion was allowed to stand overnight at 25°+/−5° C. and 50+/−2% relative humidity. After overnight reaction an aliquot of the emulsion was broken by adding methanol and the viscosity of the oil phase was determined to be greater than $1\times10^6$ cp. The polymerization of the remaining emulsion was terminated by the addition of 8.5 g of diethylamine giving an emulsion having 70% total solids.

Example 16

To a 10 liter Turello pot was charged 1280 g of Nalco 1060, a 60 nm colloidal silica from Nalco Chemical Company. With agitation at 300 RPM and scraper blade running the following items were slowly added 59.2 g AMP, 508.4 g Hydral 710 (ATH), 338 g W308, 2402.4 g Example 15 Emulsion, 10.9 g N-propylorthosilicate (NPOS) and 4 g dioctyltindilaurate. The above mixture was stirred for 10 min to achieve a smooth, lump free dispersion. This mixture was then thickened by adding a premix of 212 g water, 53.6 g ASE-75 (an acrylic associative thickener from Rohm and Haas Company) and 22.9 g RM-5 (urethane associative thickener from Rohm and Haas Company) forming a thickened coating having a total solids content of 56%. The coating was cast as a 2.5 mm slab on polyethylene. The film was allowed to dry for 14 days at 25°+/−5° C. and 50+/−2% relative humidity and then physical properties were tested. The results are as follows:

| Tensile | 1.75 MPa |
|---|---|
| Shore A Durometer | 16 |
| % Elongation at Break | 623 |
| 200% Modulus | 0.63 MPa |

This material was sent to Underwriters Laboratory in Illinois for smoke generation and flame spread testing in accordance with ASTM E-84-95 "Standard Test Method for Surface Burning Characteristics of Building Materials.". The results of the E-84 testing were more than 50 for smoke generation and less than 25 for flame spread (Dry red oak=100). Therefore, this material did not pass the smoke generation portion of the test which required a number less then 50. It is believed that the inclusion of silica as a filler contributed to this sample not passing the smoke generation portion of the E-84 test.

We claim:

1. An aqueous silicone emulsion which forms an elastomer upon the removal of water, comprising:
   (A) a dispersed phase comprising a product formed from components comprising (i) 100 parts by weight of a diorganosiloxane polymer and (ii) 0.1 to 20 parts by weight of a crosslinker selected from the group consisting of linear aminoxy-functional siloxanes having the general formula $R_3SiO(R_2SiO)_m(RSi(ONR'_2)O)_n SiR_3$, cyclic aminoxy-functional siloxanes having the general formula $(R_2SiO)_p(RSi(ONR'_2)O)_q$, aminoxy-functional silanes having the general formula $R_cSi(ONR'_2)_{4-c}$ and partial hydrolysis products thereof, where R is the same or a different alkyl group having from 1 to 8 carbon atoms and R' is the same or a different alkyl group having from 1 to 8 carbon atoms, m is an integer from 1 to 20, n is an integer from 3 to 7, p is an integer from 0 to 4, q is an integer from 3 to 7, where p+q is an integer from 3 to 7 and c is 0 or 1;
   (B) 50 to 300 parts by weight water;
   (C) 0.5 to 10 parts by weight of a surfactant selected from the group consisting of anionic and nonionic surfactants; and
   (D) 60 to 120 parts by weight of a filler selected from the group consisting of aluminum trihydrate, fumed titanium dioxide, zinc borate, magnesium oxide and ceramic fillers;
   the aqueous silicone emulsion having a viscosity of 10,000 mPa s to 120,000 mPa s measured at 24° C. and 2.5 rpm.

2. The silicone emulsion of claim 1, wherein the product further comprises 0.5 to 20 parts of a softening agent selected from nonreactive low molecular weight polydimethylsiloxane, compatible organic plasticizers and chain extenders having the formula $P''_2SiX_2$ where R" is individually selected from monovalent hydrocarbon radicals having from 1 to 8 carbon atoms and X is a hydrolyzable group, the diorganosiloxane polymer is a silanol endblocked polydimethylsiloxane, the surfactant is a nonionic surfactant and 2 to 5 parts by weight of the crosslinker which is selected from the group consisting of linear aminoxy-functional siloxanes having the general formula $R_3SiO(R_2SiO)_m(RSi(ONR'_2)O)_nSiR_3$ and cyclic aminoxy-functional siloxanes having the general formula $(R_2SiO)_p(RSi(ONR'_2)O)_q$, where R is the same or a different alkyl group having from 1 to 8 carbon atoms and R' is the same or a different alkyl group having from 1 to 8 carbon atoms, m is an integer from 1 to 20, n is an integer from 3 to 7, p is an integer from 0 to 4, q is an integer from 3 to 7, where p+q is an integer from 3 to 7.

3. The silicone emulsion of claim 2, wherein the crosslinker is $(MeEtSiO)_2(MeSi(ONEt_2)O)_3$ or $Me_3SiO(Me_2SiO)_3(MeSi(ONEt_2)0)_5SiMe_3$, where Me is methyl and Et is ethyl.

4. The silicone emulsion of claim 2, wherein the softening agent is a chain extender having the formula $R''_2SiX_2$ where R" is individually selected from monovalent hydrocarbon radicals having from 1 to 8 carbon atoms and X is a hydrolyzable group and the viscosity of the silicone emulsion is from 20,000 mPa s to 80,000 mPa s, measured at 24° C. and 2.5 rpm.

5. The silicone emulsion of claim 3, wherein the softening agent is a chain extender having the formula $R''_2SiX_2$ where R" is individually selected from monovalent hydrocarbon radicals having from 1 to 8 carbon atoms and X is a hydrolyzable group and the viscosity of the silicone emulsion is from 20,000 mPa s to 80,000 mPa s, measured at 24° C. and 2.5 rpm.

6. The silicone emulsion of claim 4, wherein the product comprises 0.5 to 2 parts by weight of the softening agent which is selected from the group consisting of $Me_2Si(OMe)_2$, $Me_2Si(OOCMe)_2$ and $MeViSi(NMeC(O)Me)_2$, where Me is methyl and Vi is vinyl and the viscosity of the silicone emulsion is from 30,000 mPa s to 50,000 mPa s, measured at 24° C. and 2.5 rpm.

7. The silicone emulsion of claim 5, wherein the product comprises 0.5 to 2 parts by weight of the softening agent which is selected from the group consisting of $Me_2Si(OMe)_2$, $Me_2Si(OOCMe)_2$ and $MeViSi(NMeC(O)Me)_2$, where Me is methyl and Vi is vinyl and the viscosity of the silicone emulsion is from 30,000 mPa s to 50,000 mPa s, measured at 24° C. and 2–5 rpm.

8. The silicone emulsion of claim 6, wherein the silicone emulsion comprises 70 to 90 parts of a filler selected from the group consisting of aluminum trihydrate and fumed titanium dioxide.

9. The silicone emulsion of claim 7, wherein the silicone emulsion comprises 70 to 90 parts of filler selected from the group consisting of aluminum trihydrate and fumed titanium dioxide.

10. The silicone emulsion of claim 6, wherein the filler comprises aluminum trihydrate and up to 10 weight percent fumed titanium dioxide.

11. The silicone emulsion of claim 7, wherein the filler comprises aluminum trihydrate and up to 10 weight percent fumed titanium dioxide.

12. The silicone emulsion of claim 10, wherein the filler comprises 5 to 7 weight percent fumed titanium dioxide.

13. The silicone emulsion of claim 11, wherein the filler comprises 5 to 7 weight percent fumed titanium dioxide.

14. A method of preparing an aqueous silicone emulsion which forms an elastomer upon the removal of water, comprising the step of mixing components comprising:
   (A)(i) 100 parts by weight of a diorganosiloxane polymer;
   (ii) 0.1 to 20 parts by weight of a crosslinker selected from the group consisting of linear aminoxy-functional siloxanes having the general formula $R_3SiO(R_2SiO)_m(RSi (ONR'_2)O)_nSiR_3$, cyclic aminoxy-functional siloxanes having the general formula $(R_2SiO)_p(RSi (ONR'_2)O)_q$, aminoxy-functional silanes having the general formula $R_cSi(ONR'_2)_{4-c}$ and partial hydrolysis products thereof, where R is the same or a different alkyl group having from 1 to 8 carbon atoms and R' is the same or a different alkyl group having from 1 to 8 carbon atoms, m is an integer from 1 to 20, n is an integer from 3 to 7, p is an integer from 0 to 4, q is an integer from 3 to 7, where p+q is an integer from 3 to 7 and c is 0 or 1;
   (B) 50 to 300 parts by weight water;
   (C) 0.5 to 10 parts by weight of a surfactant selected from the group consisting of anionic and nonionic surfactants; and
   (D) 60 to 120 parts by weight of a filler selected from the group consisting of aluminum trihydrate, fumed titanium dioxide, zinc borate, magnesium oxide and ceramic fillers;
   to produce an aqueous silicone emulsion having a viscosity of 10,000 mPa s to 120,000 mPa s measured at 24° C. and 2.5 rpm.

15. The method of claim 14, wherein the components which are mixed further comprise 0.5 to 20 parts of a softening agent selected from non-reactive low molecular weight polydimethylsiloxane, compatible organic plasticizers and chain extenders having the formula $R''_2SiX_2$ where $R''$ is individually selected from monovalent hydrocarbon radicals having from 1 to 8 carbon atoms and X is a hydrolyzable group, the diorganosiloxane polymer is a silanol endblocked polydimethylsiloxane, the surfactant is a nonionic surfactant and 2 to 5 parts by weight of the crosslinker which is selected from the group consisting of linear aminoxy-functional siloxanes having the general formula $R_3SiO(R_2SiO)_m(RSi(ONR'_2)O)_nSiR_3$ and cyclic aminoxy-functional siloxanes having the general formula $(R_2SiO)_p(RSi(ONR'_2)O)_q$, where R is the same or a different alkyl group having from 1 to 8 carbon atoms and R' is the same or a different alkyl group having from 1 to 8 carbon atoms, m is an integer from 1 to 20, n is an integer from 3 to 7, p is an integer from 0 to 4, q is an integer from 3 to 7, where p+q is an integer from 3 to 7.

16. The method of claim 15, wherein the crosslinker is $(MeEtSiO)_2$ $(MeSi(ONEt_2)O)_3$ or $Me_3SiO$ $(Me_2SiO)_3$ $(MeSi(ONEt_2)O)_5SiMe_3$ where Me is methyl and Et is ethyl.

17. The method of claim 16, wherein the softening agent is a chain extender having the formula $R''_2SiX_2$ where $R''$ is individually selected from monovalent hydrocarbon radicals having from 1 to 8 carbon atoms and X is a hydrolyzable group and the viscosity of the silicone emulsion is from 20,000 mPa s to 80,000 mPa s, measured at 24° C. and 2.5 rpm.

18. The method of claim 17, wherein the components comprise 0.5 to 2 parts by weight of the softening agent which is selected from the group consisting of $Me_2Si(OMe)_2$, $Me_2Si(OOCMe)_2$ and $MeViSi(NMeC(O)Me)_2$, where Me is methyl and Vi is vinyl and the viscosity of the silicone emulsion is from 30,000 mPa s to 50,000 mPa s, measured at 24° C. and 2.5 rpm.

19. The method of claim 18, wherein the components comprise 70 to 90 parts of filler selected from the group consisting of aluminum trihydrate and fumed titanium dioxide.

20. The method of claim 19, wherein the filler comprises 5 to 7 weight percent fumed titanium dioxide.

21. The method of claim 20, and further comprising the steps of spraying the silicone emulsion into a film and removing the water.

22. The product obtained by the method of claim 21.

23. The method of claim 14, and further comprising the steps of spraying the silicone emulsion into a film and removing the water.

24. The product obtained by the method of claim 23.

* * * * *